(12) United States Patent
Lai

(10) Patent No.: US 6,755,213 B1
(45) Date of Patent: Jun. 29, 2004

(54) TIMING SWITCH FOR GAS STOVE

(76) Inventor: Jih-Ching Lai, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/620,855

(22) Filed: Jul. 14, 2003

(51) Int. Cl.[7] ............................................... F16K 31/48
(52) U.S. Cl. ................................................ 137/624.11
(58) Field of Search ....................... 137/624.11, 624.12; 239/70

(56) References Cited

U.S. PATENT DOCUMENTS 2,713,900 A * 7/1955 Bloom .................. 137/624.11
3,595,273 A * 7/1971 Kolodziej .............. 137/614.12
3,803,923 A * 4/1974 Hajny .................... 137/624.12
4,351,360 A * 9/1982 Smyth ................... 137/624.12
5,551,474 A * 9/1996 Chuang et al. ........ 137/624.11

* cited by examiner

Primary Examiner—Kevin Lee

(57) ABSTRACT

A timing switch includes a control valve, a timing device, and a flow control device. In practice, the drive shaft is pressed by the press plate at the opened state and is pressed by the elastic member at the closed state, so that the drive shaft is operated exactly to prevent from incurring leakage, thereby enhancing the safety of the timing switch of the gas stove. Thus, the timing switch can form an actual locking state when not in use, thereby providing a safety effect exactly.

18 Claims, 5 Drawing Sheets

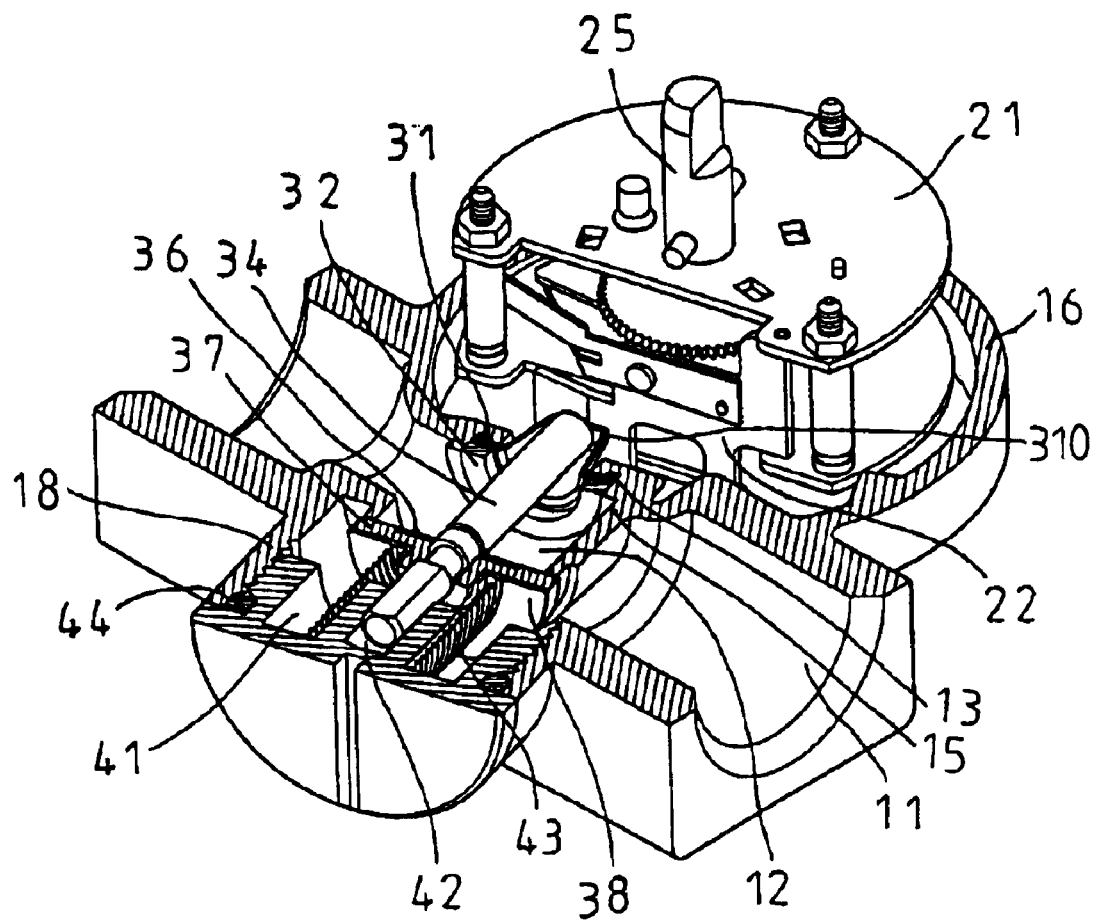
F I G. 3

TIMING SWITCH FOR GAS STOVE

BACKGROUND OF THE INVENTION

1. Field of the Invention

The present invention relates to a timing switch for a gas stove or the like, and more particularly to a timing switch that can form an actual locking state when not in use, thereby providing a safety effect exactly.

2. Description of the Related Art

A conventional gas stove is used to heat foods, such as scrambled eggs or vegetables, so that the user can cook the foods easily and rapidly. In addition, the conventional gas stove can be used to heat the water in the kettle. However, the conventional gas stove is not provided with a timing switch, so that the gas easily leaks outward unintentionally when the switch of the gas stove is not closed, thereby causing danger to the user.

SUMMARY OF THE INVENTION

The primary objective of the present invention is to provide a timing switch that can form an actual locking state when not in use, thereby providing a safety effect exactly.

Another objective of the present invention is to provide a timing switch, wherein the drive shaft is pressed by the press plate at the opened state and is pressed by the elastic member at the closed state, so that the drive shaft is operated exactly to prevent from incurring leak, thereby enhancing the safety of the timing switch of the gas stove.

A further objective of the present invention is to provide a timing switch, wherein the elastic member is received in the O-shaped groove of the cover, so that the elastic member is operated rigidly and stably to form a locking state exactly, thereby preventing the gas from entering the second flow channel when not in use.

A further objective of the present invention is to provide a timing switch that can be assembled, produced and manufactured easily and conveniently, thereby greatly decreasing costs of production.

In accordance with the present invention, there is provided a timing switch, comprising:

a control valve, a timing device, and a flow control device, wherein:

the control valve has an inner wall having a first portion formed with a first flow channel, a second portion formed with a second flow channel, and a mediate portion provided with a baffle located between the first flow channel and the second flow channel;

the baffle is formed with a gap communicating with the first flow channel and the second flow channel;

the timing device is mounted on the control valve and includes an elastic plate movably mounted on the control valve; and the flow control device is mounted in the control valve and includes a support seat mounted in the control valve and having a first side rested on the elastic plate of the timing device, a drive shaft movably mounted in the control valve and having a first end rested on a second side of the support seat, and a closure seat secured on a second end of the drive shaft to move therewith and rested on the baffle of the control valve to close the gap of the baffle so as to interrupt connection between the first flow channel and the second flow channel.

Further benefits and advantages of the present invention will become apparent after a careful reading of the detailed description with appropriate reference to the accompanying drawings.

BRIEF DESCRIPTION OF THE DRAWINGS

FIG. 3 is a perspective cross-sectional assembly view of the timing switch in accordance with the preferred embodiment of the present invention;

DETAILED DESCRIPTION OF THE INVENTION

Figure 1:
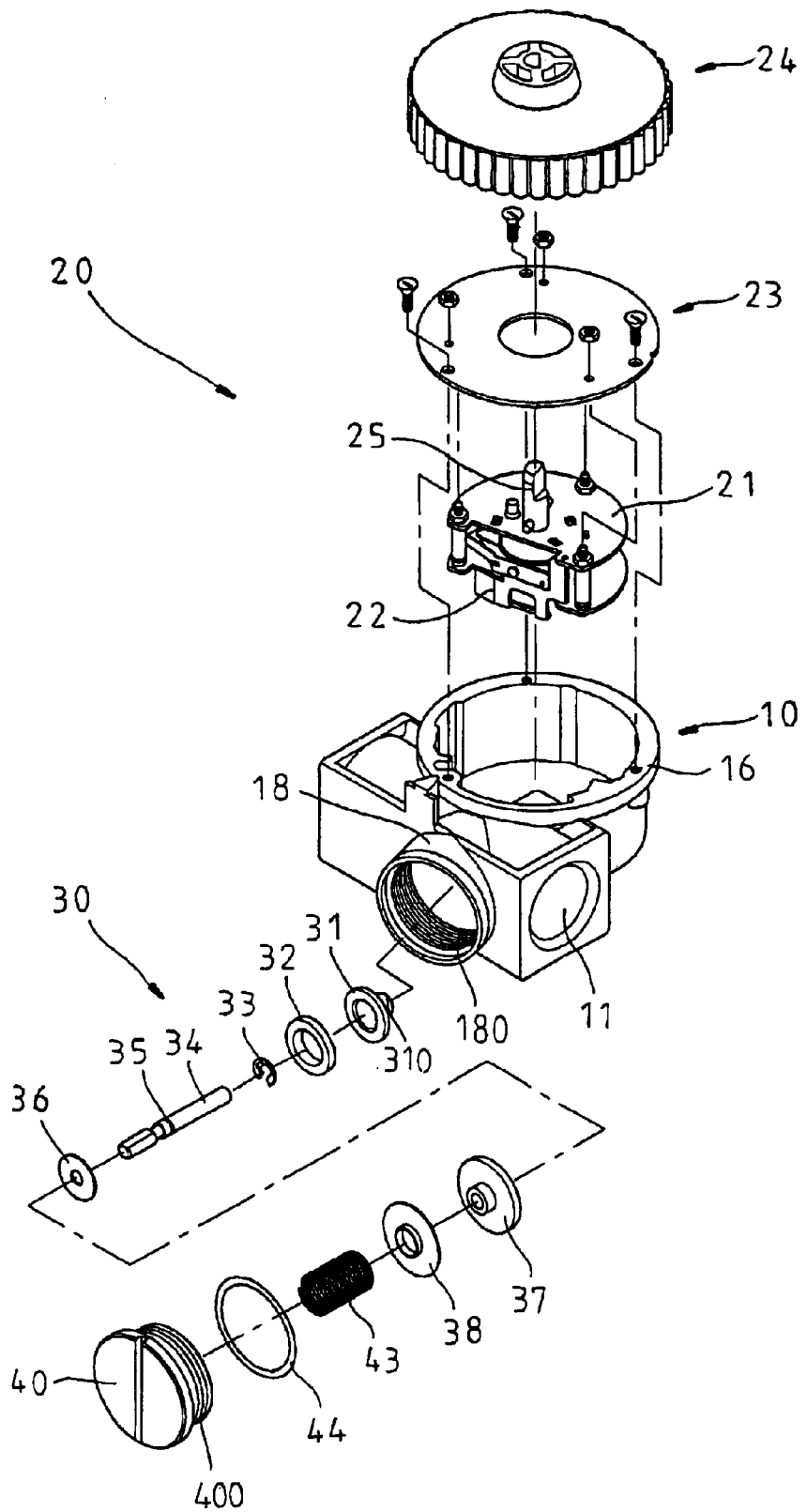
FIG. 1 is an exploded perspective view of a timing switch in accordance with the preferred embodiment of the present invention.

Referring to the drawings and initially to FIGS. 1–4, a timing switch for a gas stove or the like in accordance with the preferred embodiment of the present invention comprises a control valve 10, a timing device 20, and a flow control device 30.

The control valve 10 is a hollow body. The control valve 10 has an inner wall having a first portion formed with a first flow channel 11, a second portion formed with a second flow channel 12, and a mediate portion provided with a baffle 15 located between the first flow channel 11 and the second flow channel 12. The baffle 15 is formed with a gap 150 communicating with the first flow channel 11 and the second flow channel 12. The control valve 10 has a first side provided with a first receiving seat 16 formed with an insertion recess 13 and a second side formed with a second receiving seat 18. Preferably, the insertion recess 13 communicates with the second flow channel 12 of the control valve 10. Preferably, the second receiving seat 18 of the control valve 10 is formed with an inner thread 180.

The timing device 20 is mounted on the control valve 10. The timing device 20 includes a timer 21 secured in the first receiving seat 16 of the control valve 10, an elastic plate 22 movably mounted on the timer 21, a control shaft 25 rotatably mounted on the timer 21, and a control knob 24 rotatably mounted on the first receiving seat 16 of the control valve 10 and secured on the control shaft 25 to rotate the control shaft 25. The timing device 20 further includes a sealing plate 23 secured on the first receiving seat 16 of the control valve 10 and rested on the timer 21 to enclose the timer 21 in the first receiving seat 16 of the control valve 10.

The flow control device 30 is mounted in the control valve 10. The flow control device 30 includes a support seat 31 mounted in the insertion recess 13 of the control valve 10 and having a first side rested on the elastic plate 22 of the timing device 20, a drive shaft 34 movably mounted in the control valve 10 and having a first end rested on a second side of the support seat 31, and a closure seat 37 secured on a second end of the drive shaft 34 to move therewith and rested on the baffle 15 of the control valve 10 to close the gap 150 of the baffle 15 so as to interrupt connection between the first flow channel 11 and the second flow channel 12. Preferably, the support seat 31 of the flow control device 30 is provided with a flexible press plate 310 extended into the first receiving seat 16 of the control valve 10 and rested on the elastic plate 22 of the timing device 20. In addition, the first end of the drive shaft 34 is rested on the press plate 310 of the support seat 31.

The flow control device 30 further includes a retaining ring 32 secured in the insertion recess 13 of the control valve 10 and rested on the closure seat 31 to retain the closure seat 31 in the insertion recess 13 of the control valve 10.

The flow control device 30 further includes a substantially C-shaped snapping member 33 secured on the second end of the drive shaft 34 and rested on the closure seat 37 to limit the closure seat 37, and a washer 36 mounted on the second end of the drive shaft 34 and located between the snapping member 33 and the closure seat 37. Preferably, the second end of the drive shaft 34 is formed with a locking groove 35 to fix the snapping member 33.

The flow control device 30 further includes a cover 40 secured on the second receiving seat 18 of the control valve 10, an elastic member 43 mounted on the second end of the drive shaft 34 and urged between the closure seat 37 and the cover 40 to press the closure seat 37 to seal the baffle 15 of the control valve 10, a rubber pad 38 mounted between the closure seat 37 and the elastic member 43, and an O-ring 44 mounted between the cover 40 and the second receiving seat 18 of the control valve 10. Preferably, the cover 40 is formed with an outer thread 400 screwed into the inner thread 180 of the second receiving seat 18 of the control valve 10. In addition, the cover 40 has a center formed with a receiving hole 42 to receive the second end of the drive shaft 34. In addition, the cover 40 is formed with an O-shaped groove 41 to receive the elastic member 43.

In assembly, the timer 21 of the timing device 20 is mounted in the first receiving seat 16 of the control valve 10. Then, the sealing plate 23 of the timing device 20 is on the first receiving seat 16 of the control valve 10 and rested on the timer 21 to enclose the timer 21 in the first receiving seat 16 of the control valve 10. Then, the control knob 24 of the timing device 20 is rotatably mounted on the first receiving seat 16 of the control valve 10 and secured on the control shaft 25, so that the control shaft 25 can be rotated by the control knob 24. Then, the support seat 31 and the retaining ring 32 of the flow control device 30 are secured in the insertion recess 13 of the control valve 10, with the press plate 310 of the support seat 31 being extended into the first receiving seat 16 of the control valve 10. Then, the drive shaft 34 of the flow control device 30 is mounted in the control valve 10 with the first end of the drive shaft 34 being rested on the press plate 310 of the support seat 31. Then, the snapping member 33 is locked in the locking groove 35 of the drive shaft 34. Then, the washer 36, the closure seat 37, the rubber pad 38 and the elastic member 43 are in turn mounted on the second end of the drive shaft 34, with the washer 36 being rested on the snapping member 33. Finally, the cover 40 is screwed on the second receiving seat 18 of the control valve 10, with the elastic member 43 being urged between the closure seat 37 and the cover 40 to press the closure seat 37 to seal the baffle 15 of the control valve 10.

Figure 2:
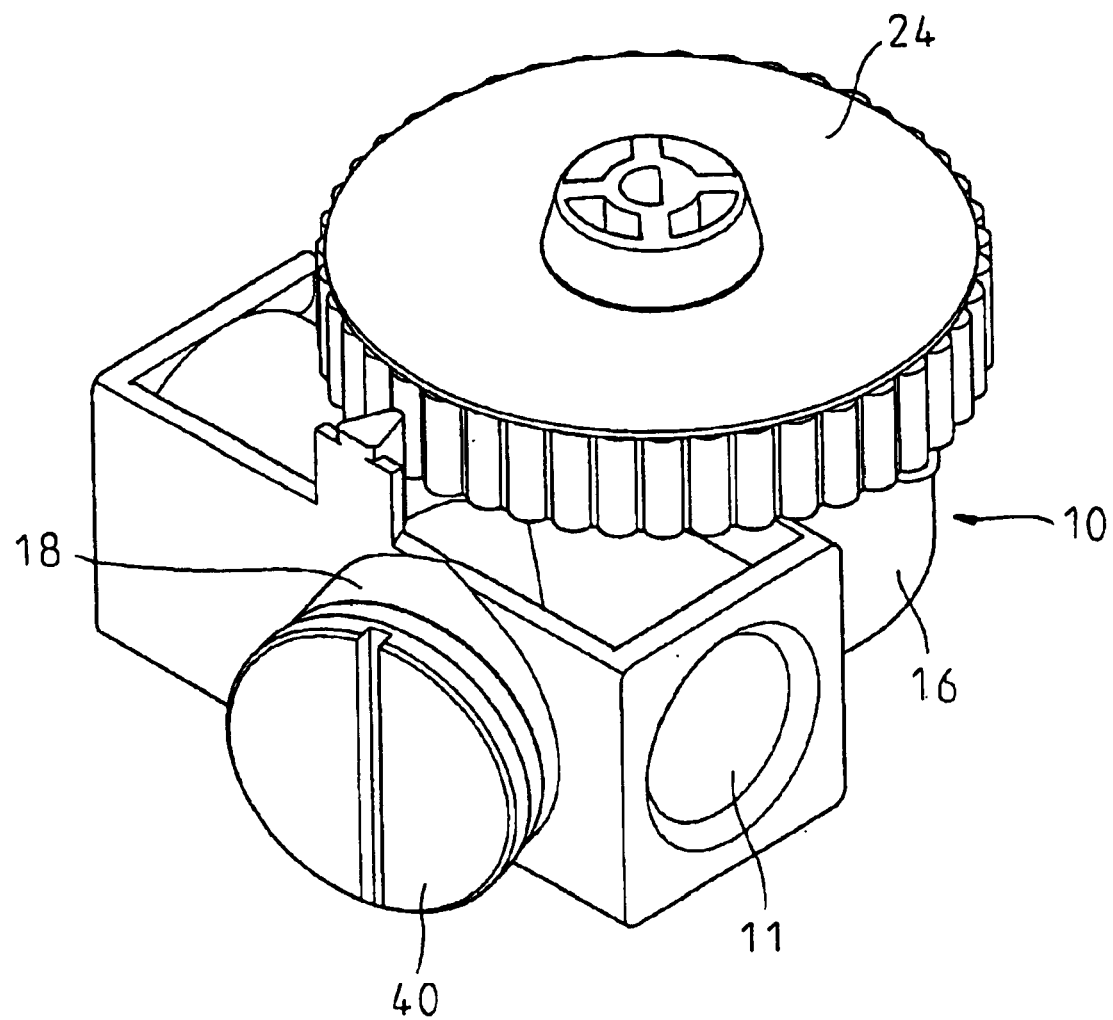
FIG. 2 is a perspective assembly view of the timing switch in accordance with the preferred embodiment of the present invention.
Figure 4:
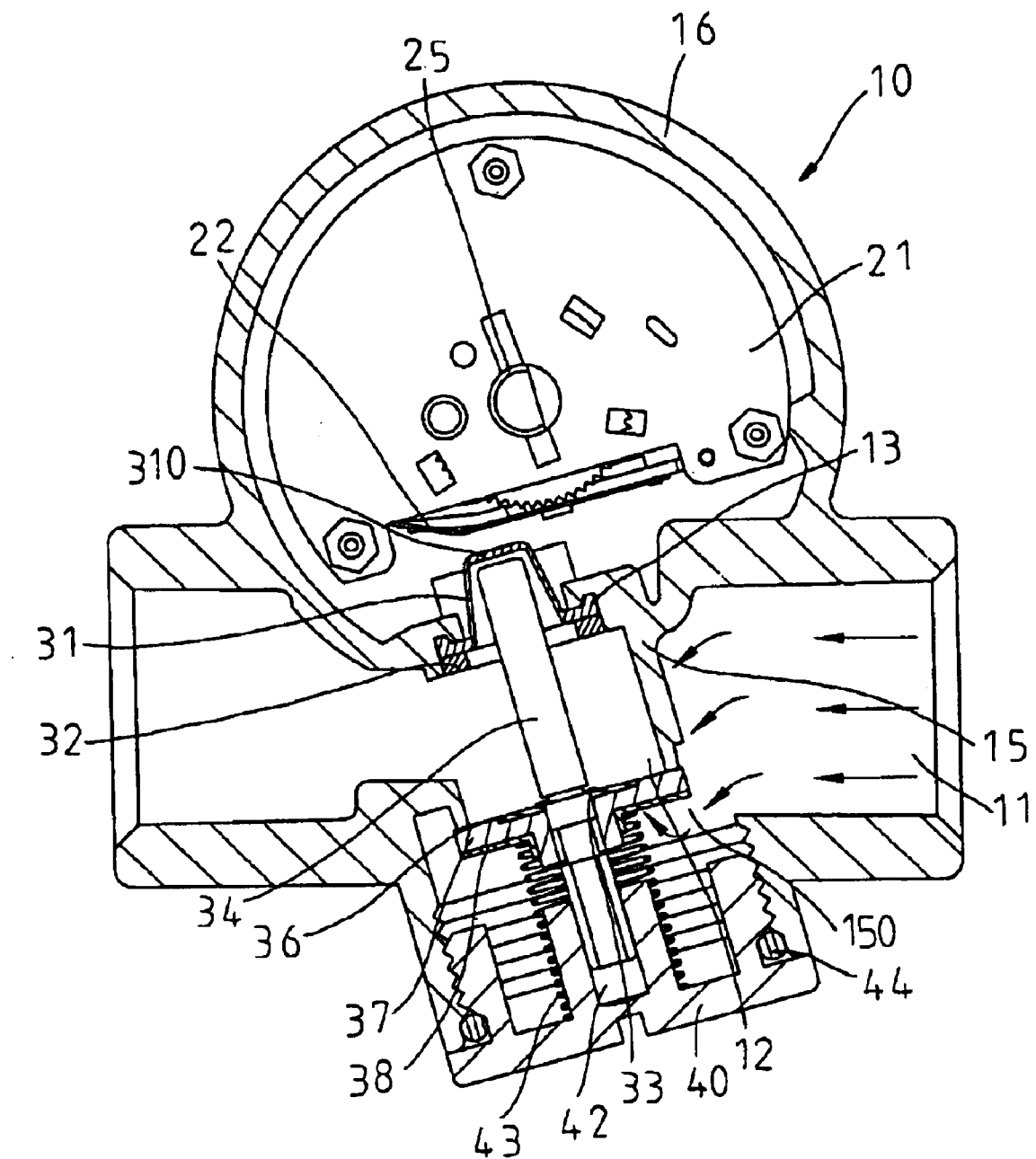
FIG. 4 is a top plan cross-sectional assembly view of the timing. switch as shown in FIG. 1.
Figure 5:
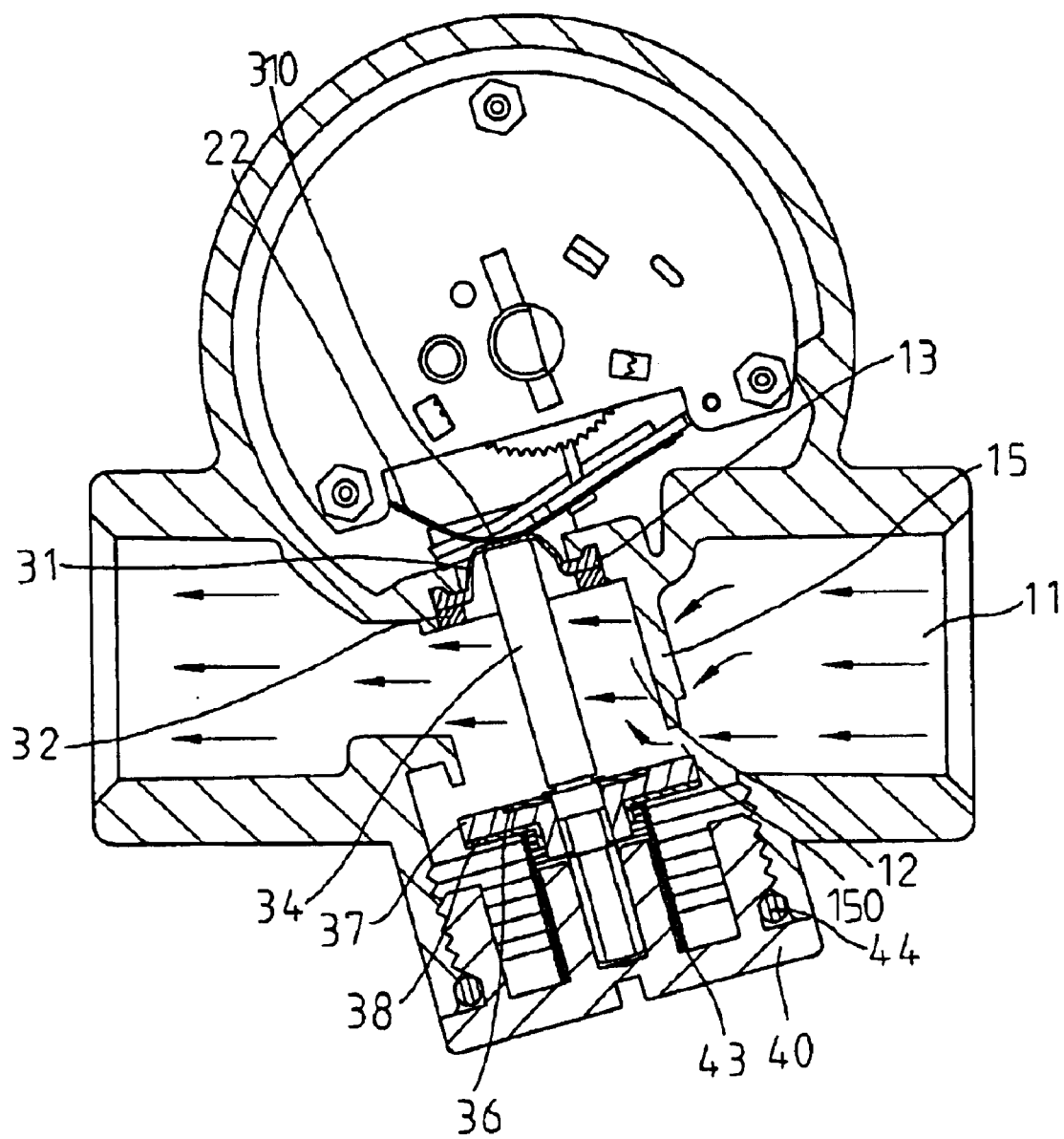
FIG. 5 is a schematic operational view of the timing switch as shown in FIG. 4.

In operation, referring to FIGS. 4 and 5 with reference to FIGS. 1–3, when the timer 21 of the timing device 20 is started, the elastic plate 22 of the timing device 20 is moved forward to the position as shown in FIG. 5 to press the press plate 310 which presses the first end of the drive shaft 34, so that the drive shaft 34 is moved forward to push the closure seat 37, thereby detaching the closure seat 37 from the baffle 15 of the control valve 10, and thereby opening the gap 150 of the baffle 15 so as to connect the first flow channel 11 with the second flow channel 12, so that the gas of the gas stove can flow from the first flow channel 11 through the gap 150 of the baffle 15 into the second flow channel 12 for use.

When the preset time of the timer 21 of the timing device 20 is reached, the elastic plate 22 of the timing device 20 is returned to the original position as shown in FIG. 4 to release the press plate 310 which is also returned to the original position as shown in FIG. 4, so that the drive shaft 34 and the closure seat 37 are moved backward by the restoring force of the elastic member 43 to press and block the baffle 15 of the control valve 10, thereby closing the gap 150 of the baffle 15, and thereby interrupting connection between the first flow channel 11 and the second flow channel 12, so that the gas of the gas stove cannot flow from the first flow channel 11 through the gap 150 of the baffle 15 into the second flow channel 12 when not in use.

Accordingly, the timing switch of the gas stove can form an actual locking state when not in use, thereby providing a safety effect exactly. In addition, the drive shaft 34 is pressed by the press plate 310 at the opened state and is pressed by the elastic member 43 at the closed state, so that the drive shaft 34 is operated exactly to prevent from incurring leak, thereby enhancing the safety of the timing switch of the gas stove. Further, the elastic member 43 is received in the O-shaped groove 41 of the cover 40, so that the elastic member 43 is operated rigidly and stably to form a locking state exactly, thereby preventing the gas from entering the second flow channel 12 when not in use. Further, the timing switch of the gas stove can be assembled, produced and manufactured easily and conveniently, thereby greatly decreasing costs of production.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A timing switch, comprising:
   a control valve, a timing device, and a flow control device, wherein:
      the control valve has an inner wall having a first portion formed with a first flow channel, a second portion formed with a second flow channel, and a mediate portion provided with a baffle located between the first flow channel and the second flow channel;
      the baffle is formed with a gap communicating with the first flow channel and the second flow channel;
      the timing device is mounted on the control valve and includes an elastic plate movably mounted on the control valve; and
      the flow control device is mounted in the control valve and includes a support seat mounted in the control valve and having a first side rested on the elastic plate of the timing device, a drive shaft movably mounted in the control valve and having a first end rested on a second side of the support seat, and a closure seat secured on a second end of the drive shaft to move therewith and rested on the baffle of the control valve to close the gap of the baffle so as to interrupt connection between the first flow channel and the second flow channel.

2. The timing switch in accordance with claim 1, wherein the control valve has a first side provided with a first receiving seat formed with an insertion recess and a second side formed with a second receiving seat.

3. The timing switch in accordance with claim 2, wherein the insertion recess communicates with the second flow channel of the control valve.

4. The timing switch in accordance with claim 2, wherein the timing device includes a timer secured in the first receiving seat of the control valve, a control shaft rotatably mounted on the timer, and a control knob rotatably mounted on the first receiving seat of the control valve and secured on the control shaft to rotate the control shaft.

5. The timing switch in accordance with claim 4, wherein the timing device further includes a sealing plate secured on the first receiving seat of the control valve and rested on the timer to enclose the timer in the first receiving seat of the control valve.

6. The timing switch in accordance with claim 2, wherein the support seat mounted in the insertion recess of the control valve.

7. The timing switch in accordance with claim 1, wherein the support seat of the flow control device is provided with a flexible press plate rested on the elastic plate of the timing device.

8. The timing switch in accordance with claim 7, wherein the first end of the drive shaft is rested on the press plate of the support seat.

9. The timing switch in accordance with claim 2, wherein the flow control device further includes a retaining ring secured in the insertion recess of the control valve and rested on the closure seat to retain the closure seat in the insertion recess of the control valve.

10. The timing switch in accordance with claim 1, wherein the flow control device further includes a substantially C-shaped snapping member secured on the second end of the drive shaft and rested on the closure seat to limit the closure seat.

11. The timing switch in accordance with claim 10, wherein the second end of the drive shaft is formed with a locking groove to fix the snapping member.

12. The timing switch in accordance with claim 10, wherein the flow control device further includes a washer mounted on the second end of the drive shaft and located between the snapping member and the closure seat.

13. The timing switch in accordance with claim 2, wherein the flow control device further includes a cover secured on the second receiving seat of the control valve, and an elastic member mounted on the second end of the drive shaft and urged between the closure seat and the cover to press the closure seat to seal the baffle of the control valve.

14. The timing switch in accordance with claim 13, wherein the flow control device further includes a rubber pad mounted between the closure seat and the elastic member.

15. The timing switch in accordance with claim 13, wherein the flow control device further includes an O-ring mounted between the cover and the second receiving seat of the control valve.

16. The timing switch in accordance with claim 13, wherein the second receiving seat of the control valve is formed with an inner thread, and the cover is formed with an outer thread screwed into the inner thread of the second receiving seat of the control valve.

17. The timing switch in accordance with claim 13, wherein the cover has a center formed with a receiving hole to receive the second end of the drive shaft.

18. The timing switch in accordance with claim 13 wherein the cover is formed with an O-shaped groove to receive the elastic member.

* * * * *